US009039238B2

(12) United States Patent
Kim et al.

(10) Patent No.: US 9,039,238 B2
(45) Date of Patent: May 26, 2015

(54) LIGHTING MODULE AND LIGHTING DEVICE

(75) Inventors: Kwang Soo Kim, Seoul (KR); Young Ho Shin, Seoul (KR); Ki Man Park, Seoul (KR); Bu Kwan Je, Seoul (KR); Sang Hoon Park, Seoul (KR); Ye Seul Yang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 18 days.

(21) Appl. No.: 13/368,678

(22) Filed: Feb. 8, 2012

(65) Prior Publication Data

US 2012/0140437 A1 Jun. 7, 2012

(30) Foreign Application Priority Data

Feb. 21, 2011 (KR) ........................ 10-2011-0015159
Feb. 21, 2011 (KR) ........................ 10-2011-0015160
Sep. 16, 2011 (KR) ........................ 10-2011-0093405

(51) Int. Cl.

| | |
|---|---|
| ***F21V 29/00*** | (2006.01) |
| ***F21V 5/00*** | (2006.01) |
| ***B60Q 1/06*** | (2006.01) |
| ***F21V 7/20*** | (2006.01) |
| ***F21S 4/00*** | (2006.01) |
| ***F21V 21/00*** | (2006.01) |
| ***F21K 99/00*** | (2010.01) |
| ***F21V 5/04*** | (2006.01) |
| ***F21V 15/01*** | (2006.01) |
| *F21S 2/00* | (2006.01) |
| *F21V 31/00* | (2006.01) |
| *F21W 131/103* | (2006.01) |
| *F21Y 101/02* | (2006.01) |
| *F21Y 103/00* | (2006.01) |
| *F21Y 105/00* | (2006.01) |

(52) U.S. Cl.
CPC .. *F21K 9/00* (2013.01); *F21S 2/005* (2013.01); *F21V 5/007* (2013.01); *F21V 5/04* (2013.01); *F21V 15/01* (2013.01); *F21V 15/011* (2013.01); *F21V 29/004* (2013.01); *F21V 29/225* (2013.01); *F21V 29/244* (2013.01); *F21V 29/246* (2013.01); *F21V 29/262* (2013.01); *F21V 31/005* (2013.01); *F21W 2131/103* (2013.01); *F21Y 2101/02* (2013.01); *F21Y 2103/003* (2013.01); *F21Y 2105/001* (2013.01)

(58) Field of Classification Search
USPC ......... 362/84, 249.02, 244, 249.01, 294, 373, 362/345, 264, 218
See application file for complete search history.

(56) References Cited

U.S. PATENT DOCUMENTS 5,479,327 A * 12/1995 Chen ............................ 362/222
7,572,027 B2 * 8/2009 Zampini et al. ............... 362/225
(Continued)

FOREIGN PATENT DOCUMENTS

JP 2010-049830 A 3/2010
KR 10-2009-0084029 A 8/2009

OTHER PUBLICATIONS

Machine translation of KR2003-0016350 to Hui-Su Moon, Feb. 26, 2003.*

*Primary Examiner* — Peggy Neils
*Assistant Examiner* — William N Harris
(74) *Attorney, Agent, or Firm* — Birch, Stewart, Kolasch & Birch, LLP

(57) ABSTRACT

A lighting module may be provided that includes: a light emitter; a clad metal substrate which is disposed under the light emitter; an insulating structure which insulates the light emitter from the clad metal substrate; an optical structure which is disposed on the light emitter; and a case which is disposed on the optical structure and is coupled to the clad metal substrate, wherein the light emitter includes a semiconductor based light emitting device.

24 Claims, 6 Drawing Sheets

(56) References Cited

U.S. PATENT DOCUMENTS

| | | | | |
|---|---|---|---|---|
| 7,841,741 | B2 * | 11/2010 | Chan et al. | 362/249.04 |
| 8,500,297 | B2 * | 8/2013 | Harbers et al. | 362/231 |
| 2003/0189826 | A1 | 10/2003 | Yoon | |
| 2006/0227558 | A1 | 10/2006 | Osawa et al. | |
| 2008/0025028 | A1 * | 1/2008 | Gloisten et al. | 362/294 |
| 2009/0303711 | A1 * | 12/2009 | Remus et al. | 362/234 |
| 2010/0226139 | A1 * | 9/2010 | Lynch et al. | 362/373 |
| 2010/0309660 | A1 * | 12/2010 | Lim et al. | 362/231 |

* cited by examiner

LIGHTING MODULE AND LIGHTING DEVICE

CROSS-REFERENCE TO RELATED APPLICATION

The present application claims priority under 35 U.S.C. §119(e) of Korean Patent Application No. 10-2011-0015159 filed Feb. 21, 2011, No. 10-2011-0015160 filed Feb. 21, 2011 and No. 10-2011-0093405 filed Sep. 16, 2011 the subject matters of which are incorporated herein by reference.

BACKGROUND

1. Field

Embodiments may relate to a lighting module and lighting device.

2. Background

A light emitting diode (LED) is an energy device for converting electric energy into light energy. Compared with an electric bulb, the LED has higher conversion efficiency, lower power consumption and a longer life span. As there advantages are widely known, more and more attentions are now paid to a lighting apparatus using the LED.

The lighting apparatus using the LED are generally classified into a direct lighting apparatus and an indirect lighting apparatus. The direct lighting apparatus emits light emitted from the LED without changing the path of the light. The indirect lighting apparatus emits light emitted from the LED by changing the path of the light through reflecting means and so on. Compared with the direct lighting apparatus, the indirect lighting apparatus mitigates to some degree the intensified light emitted from the LED and protects the eyes of users.

SUMMARY

One embodiment is a lighting module. The lighting module includes: a light emitter; a clad metal substrate which is disposed under the light emitter; an insulating structure which insulates the light emitter from the clad metal substrate; an optical structure which is disposed on the light emitter; and a case which is disposed on the optical structure and is coupled to the clad metal substrate, wherein the light emitter includes a semiconductor based light emitting device.

Another embodiment is a lighting module. The lighting module includes: a light emitter which includes a substrate and a plurality of the light emitting devices disposed on the substrate; a case of which at least a portion is disposed on the light emitter and which protects the light emitter; a packing structure disposed on the light emitter; an insulating structure which is located between the light emitter and the case; and a support layer which is disposed under the light emitter and supports the light emitter, wherein the light emitting devices include a light emitting diode (LED).

Further another embodiment is a lighting device. The lighting device includes: a heat sink which includes a receiving recess and a plurality of partitions disposed on a portion thereof; one or more lighting modules which are disposed under the heat sink and emit light downward; a power supplier which is disposed in the receiving recess and supplies electric power to the lighting module; and a waterproof cap which is coupled to at least a portion of the top surface of the heat and prevents water from being introduced into the receiving recess of the heat sink. The lighting module includes: a light emitter which includes a light emitting diode (LED); a clad metal substrate which is disposed under the light emitter; and a case which is disposed on the light emitter and is coupled to the clad metal substrate.

BRIEF DESCRIPTION OF THE DRAWINGS

Arrangements and embodiments may be described in detail with reference to the following drawings in which like reference numerals refer to like elements and wherein.

DETAILED DESCRIPTION

A thickness or a size of each layer may be magnified, omitted or schematically shown for the purpose of convenience and clearness of description. The size of each component may not necessarily mean its actual size.

It should be understood that when an element is referred to as being 'on' or "under" another element, it may be directly on/under the element, and/or one or more intervening elements may also be present. When an element is referred to as being 'on' or 'under', 'under the element' as well as 'on the element' may be included based on the element.

An embodiment may be described in detail with reference to the accompanying drawings.

Figure 1:
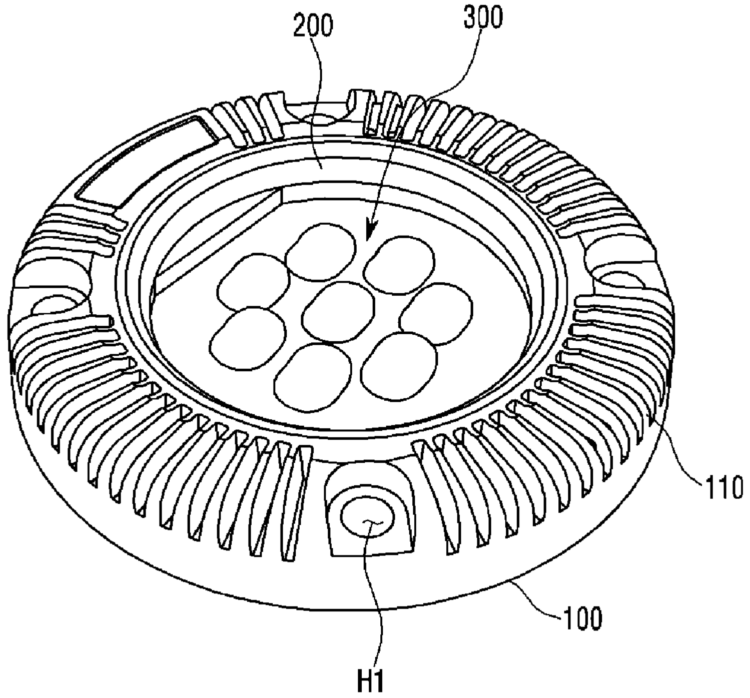
FIG. 1 is a top perspective view of a lighting module according to an embodiment.
Figure 2:
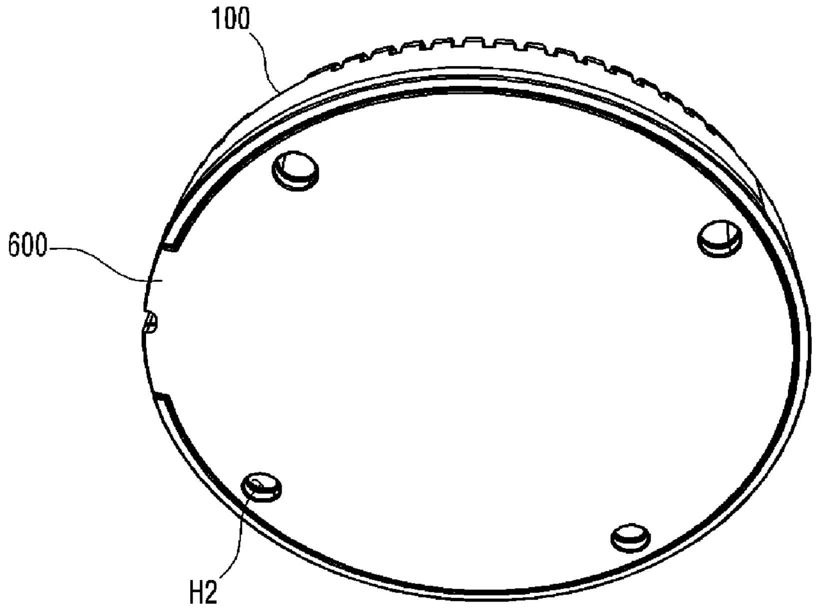
FIG. 2 is a bottom perspective view of the lighting module shown in FIG. 1.
Figure 3:
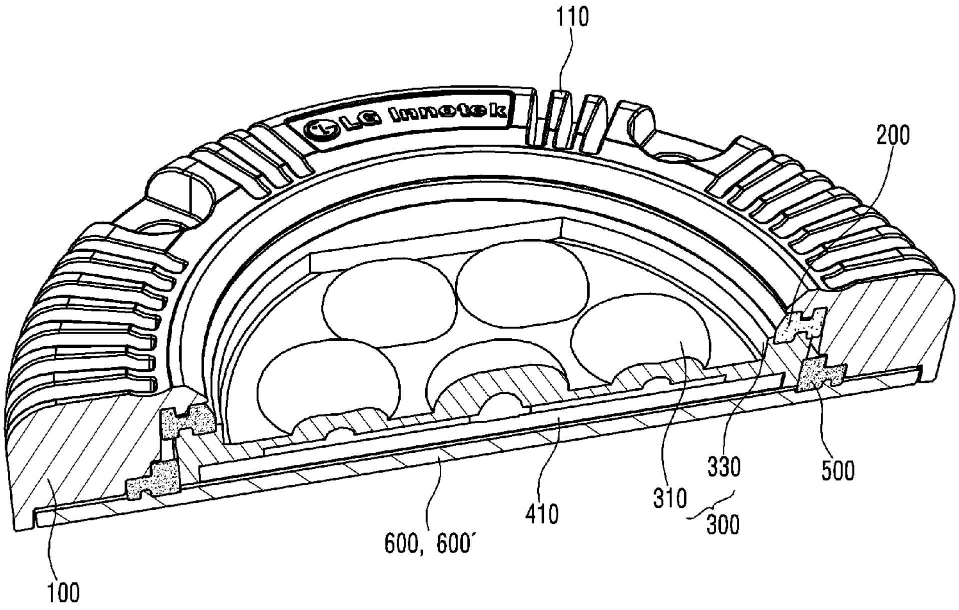
FIG. 3 is a cross sectional view of the lighting module shown in FIG. 1.
Figure 4:
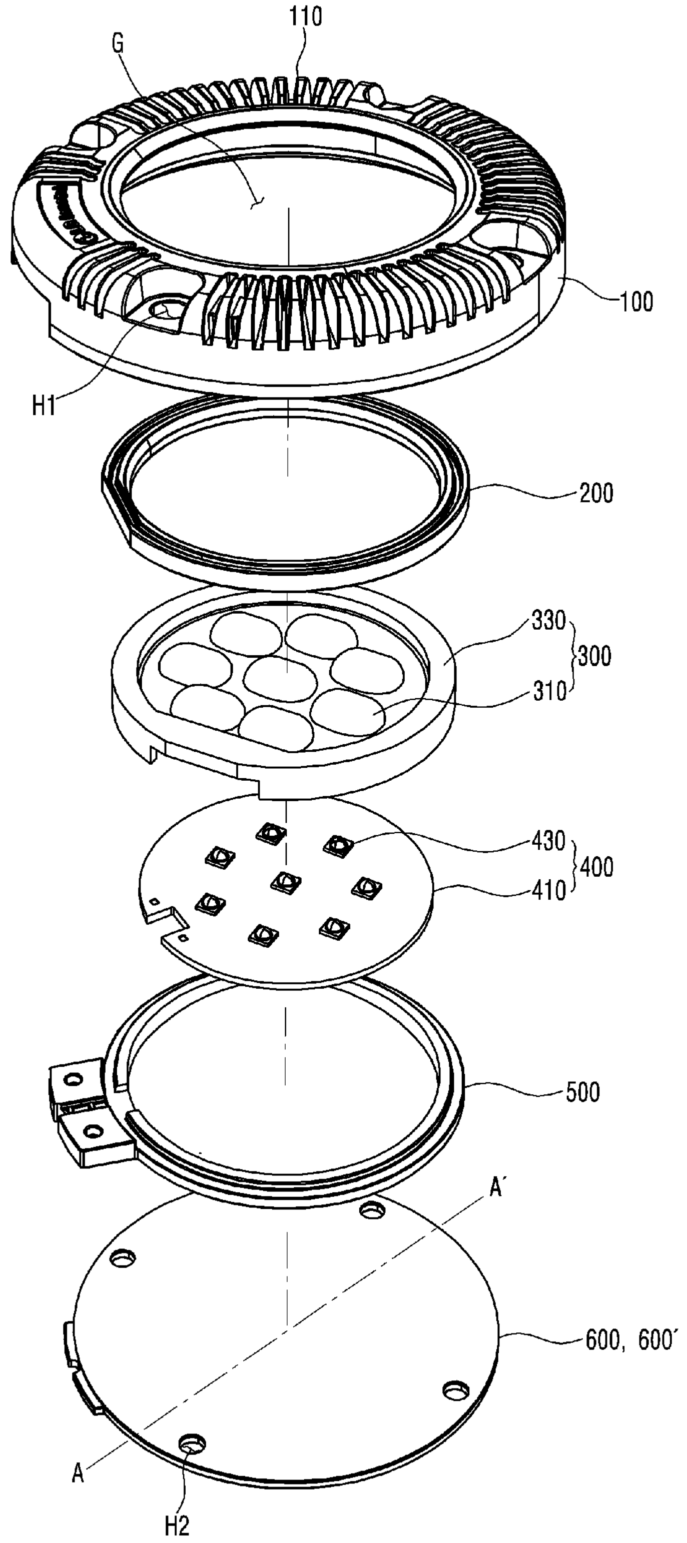
FIG. 4 is an exploded perspective view of the lighting module shown in FIG. 1.

FIG. 1 is a top perspective view of a lighting module according to an embodiment. FIG. 2 is a bottom perspective view of the lighting module shown in FIG. 1. FIG. 3 is a cross sectional view of the lighting module shown in FIG. 1. FIG. 4 is an exploded perspective view of the lighting module shown in FIG. 1.

Referring to FIGS. 1 to 4, the lighting module according to the embodiment may include a case 100, a packing structure 200, an optical structure 300, a light emitter 400 and an insulating structure 500. Here, the lighting module may further include a clad metal substrate 600.

The case 100 may be coupled and fixed to the clad metal substrate 600 by use of a coupling means like a coupling screw, etc., and may form a body of the lighting module according to the embodiment. Specifically, when the coupling screw passes through a through-hole "H1" of the case 100 and is inserted and fixed to a locking recess "H2" of the clad metal substrate 600, so that the case 100 and the clad metal substrate 600 may be coupled to each other.

The case 100 may be coupled to or separated from the clad metal substrate 600 by means of the coupling screw. Therefore, when the lighting module is broken, it is possible to easily maintain or repair the lighting module by inserting or removing the coupling screw.

The case 100 may have a circular donut-shaped body. The case 100 receives and protects the packing structure 200, the optical structure 300, the light emitter 400 and the insulating structure 500.

The case 100 includes an opening "G" for allowing light which has passed through the optical structure 300 to be emitted to the outside. Therefore, the optical structure 300 is exposed outward through the opening "G".

It is recommended that the case 100 should be made of a thermal conductive material in order to radiate heat from the light emitter 400. For example, the case 100 may be made of a metallic material. Specifically, the metallic material may include at least one of Al, Ni, Cu, Au and Sn. Here, the outer surface of the case 100 may include a plurality of heat radiating fins 110 for radiating the heat from the light emitter 400. The heat radiating fins 110 increase the surface area of the case 100, so that the heat can be more effectively radiated.

The packing structure 200 is disposed between the case 100 and the optical structure 300, which prevents water and impurity from penetrating into the light emitter 400. The packing structure 200 may be made of an elastic material not permitting the water to penetrate therethrough. For example, waterproof rubber or a waterproof silicon material may be used as a material of the packing structure 200.

The packing structure 200 may have a circular ring shape in such a manner as to be disposed on an outer frame 330 of the optical structure 300. Here, the packing structure 200 may have various shapes depending on the shape of the optical structure 300. When the packing structure 200 is disposed on the optical structure 300, the case 100 presses the packing structure 200. Therefore, the packing structure 200 fills a space between the case 100 and the optical structure 300, thereby stopping water and impurities from penetrating through the light emitter 400 through the opening "G" of the case 100. Accordingly, the reliability of the light source module according to the embodiment can be improved.

The optical structure 300 is disposed on the light emitter 400 and optically controls light emitted from the light emitter 400. The optical structure 300 includes a lens 310 and an outer frame 330.

The optical structure 300 may be injection-molded by use of a light transmitting material. The light transmitting material can be implemented by a plastic material such as glass, poly methyl methacrylate (PMMA), polycarbonate (PC) and the like.

FIG. 4 shows that the optical structure 300 has a shape having a plurality of dome-shaped lenses 310. However, there is no limit to the shape of the optical structure 300. Another specific embodiment will be described later.

A plurality of the lenses 310 may be disposed on the top surface of the optical structure 300. The lens 310 may have a dome shape.

The lens 310 controls light incident from the light emitter 400. Here, the control of the light means a diffusion or collection of the light incident from the light emitter 400. When a light emitting device 430 of the light emitter 400 is a light emitting diode, the lens 310 is able to diffuse the light from the light emitting device 430. Besides, the lens 310 is also able to collect the light from the light emitter 400 instead of diffusing.

The lens 310 may one-to-one correspond to the light emitting device 430 of the light emitter 400. That is, the number of the lenses 310 may be the same as the number of the light emitting devices 430. For example, as shown in FIG. 4, when eight light emitting devices 430 are disposed on a substrate 410, eight lenses 310 are disposed one to one correspondingly to the eight light emitting devices 430.

The lens 310 may include a fluorescent material (not shown). The fluorescent material may include at least one of a yellow fluorescent material, a green fluorescent material or a red fluorescent material. Particularly, when the light emitting device 430 of the light emitter 400 is a blue light emitting diode, the lens 310 may include at least one of the yellow, green and red fluorescent materials. Thus, thanks to the fluorescent material included in the lens 310, a color rendering index (CRI) of light emitted from the light emitting device 430 can be improved.

The packing structure 200 is disposed on the outer frame 330. For this purpose, the outer frame 330 may have a flat shape allowing the packing structure 200 to be entirely seated on the outer frame 330. However, the outer frame 330 may be inward or outward inclined without being limited to this. When the packing structure 200 includes a predetermined recess, the outer frame 330 may include a projection (not shown) which is fitted into and coupled to the predetermined recess. As such, the outer frame 330 has various types of embodiments allowing the packing structure 200 to be easily mounted thereon.

The outer frame 330 together with the case 100 press the packing structure 200 and prevent water or impurities from being introduced between the outer frame 330 and the packing structure 200. Therefore, the light emitter 400 is protected from water or impurities.

The outer frame 330 may cause the lens 310 and the light emitting device 430 of the light emitter 400 to be spaced from each other at a regular interval. The outer frame 330 may form a space between the lens 310 and the light emitting device 430. When the light emitting device 430 of the light emitter 400 is a light emitting diode, light emitted from the light emitting diode 430 may have a light distribution angle of approximately 120°. This is because a regular interval is required between the light emitter 400 and the lens 310 in order to obtain a desired light distribution by use of the light.

Another embodiment of the optical structure 300 will be described with reference to FIGS. 5 to 6.

Figure 5:
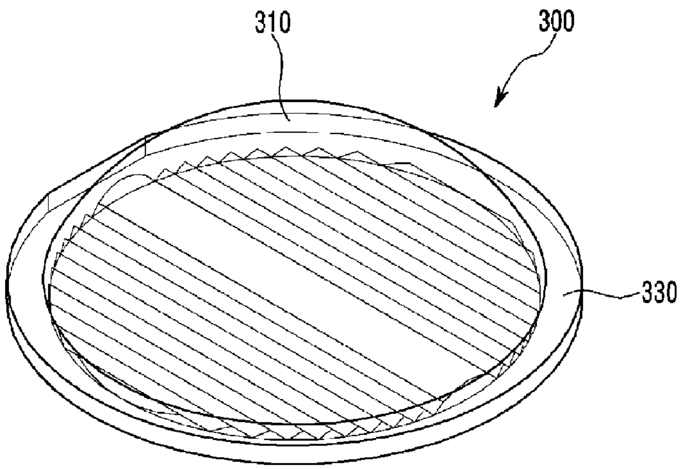
FIG. 5 shows another embodiment of an optical structure of the lighting module shown in FIG. 4.

FIG. 5 shows another embodiment of the optical structure 300 of the lighting module shown in FIG. 4. FIG. 6 is a cross sectional view of the optical structure 300 shown in FIG. 5.

Figure 6:
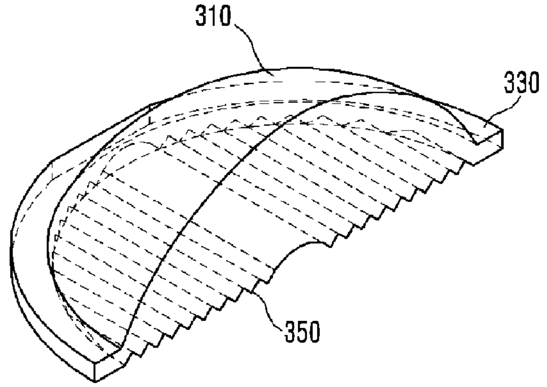
FIG. 6 is a cross sectional view of the optical structure shown in FIG. 5.

Like the optical structure 300 shown in FIG. 4, the optical structure 300 shown in FIGS. 5 to 6 includes the lens 310 and the outer frame 330. However, the optical structure 300 shown in FIGS. 5 to 6 includes one lens 310 instead of a plurality of the lenses 310.

Accordingly, since the optical structure 300 shown in FIGS. 5 to 6 includes the lens 310 and the outer frame 330 of the optical structure 300 shown in FIG. 4, the optical structure 300 shown in FIGS. 5 to 6 includes the functions and roles of the lens 310 and the outer frame 330 of the foregoing optical structure 300 shown in FIG. 4.

Here, a light incident surface 350 of the optical structure 300 shown in FIGS. 5 to 6 may have a predetermined uneven. The irregular shape may include, as shown in FIG. 6, a prism shape or a hemispherical shape. In this manner, through uneven of the light incident surface 350 of the optical structure 300, light-extraction efficiency can be improved and a desired light distribution can be obtained.

The light emitter 400 is disposed on the clad metal substrate 600 and under the optical structure 300. The light emitter 400 may include the substrate 410 and a plurality of the light emitting devices 430 disposed on the substrate 410.

The substrate 410 may have, as shown in the drawings, a disc shape. However, the shape of the substrate 410 is not limited to this.

The substrate 410 may be formed by printing a circuit on an insulator and may be any one of an aluminum substrate, a ceramic substrate, a metal core PCB, a common PCB or a flexible PCB.

The plurality of the light emitting devices 430 are arranged on one side of the substrate 410. The one side of the substrate 410 may have a color capable of efficiently reflecting light, for example, white color.

The plurality of the light emitting devices 430 are disposed on the substrate 410. Here, the plurality of the light emitting devices 430 may be disposed on the substrate 410 in the form of an array. The shapes and the number of the plurality of the light emitting devices 430 may be variously changed according to needs.

The light emitting device 430 may be a light emitting diode (LED). At least one of a red LED, a blue LED, a green LED or a white LED may be selectively used as the light emitting device 430, or may be used with variety.

The substrate 410 may include a DC converter or a protective device. The DC converter converts AC to DC and supplies the DC. The protective device protects the lighting device from ESD, a Surge phenomenon or the like.

Figure 10:
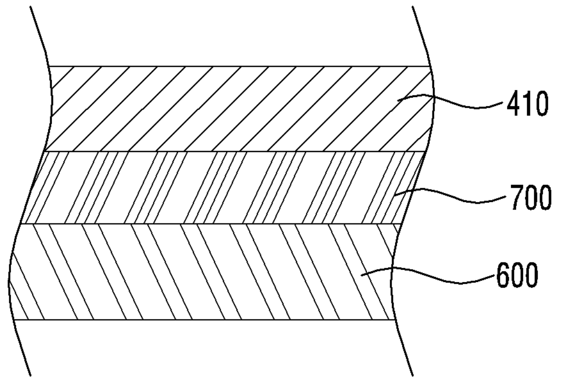
FIG. 10 is a cross section view of the substrate, heat radiating plate and the clad metal substrate.

Referring to FIG. 10, a heat radiating plate 700 may be disposed on the bottom surface of the substrate 410. The heat radiating plate 700 may efficiently transfer the heat generated from the light emitter 400 to the clad metal substrate 600. The heat radiating plate 700 may be formed of a material having thermal conductivity. For example, the heat radiating plate may be a thermal conduction silicon pad or a thermal conductive tape.

The insulating structure 500 surrounds the outer circumferential surface of the light emitter 400. To this end, the insulating structure 500 has a ring shape in accordance with the circular-shaped light emitter 400. Although the drawings show that the insulating structure 500 has a ring shape, there is no limit to the shape of the insulating structure 500.

It is desirable that the insulating structure 500 should be made of an insulation material. For example, the insulating structure 500 may be made of a rubber material or a silicone material. The insulating structure 500 is able to electrically protect the light emitter 400. In other words, the insulating structure 500 electrically insulates the lateral surface of the light emitter 400 from the clad metal substrate 600 and the metallic case 100. Therefore, a withstand voltage of the lighting module according to the embodiment can be increased and the reliability can be improved. The insulating structure 500 is also able to prevent water or impurities from being introduced into the light emitter 400. As seen in FIG. 3, the insulating structure 500 has a stepped surface matching the stepped surface of the case 100 where the insulating structure 500 contacts the case 100.

The clad metal substrate 600 is disposed under the light emitter 400 and may be coupled to the case 100. Therefore, the clad metal substrate 600 is able to radiate heat from the light emitter 400 by itself or transfer the heat to the case 100. Here, it is recommended that the clad metal substrate 600 should be configured to come in direct or indirect contact with the bottom surface of the light emitter 400. When the clad metal substrate 600 comes in indirect contact with the bottom surface of the substrate 410 of the light emitter 400, it means that the heat radiating plate 700, as shown in FIG. 10, is disposed on the bottom surface of the substrate 410.

The clad metal substrate 600 is a metal laminate formed by combining a plurality of heterogeneous metal layers. Here, the clad metal substrate 600 may be replaced by either a heat radiating layer which has electrically insulation characteristics and thermally a heat radiating characteristic or a support layer 600' composed of a polymeric material or a non-metallic material. The clad metal substrate 600 will be described in detail with reference to FIG. 7.

Figure 7:
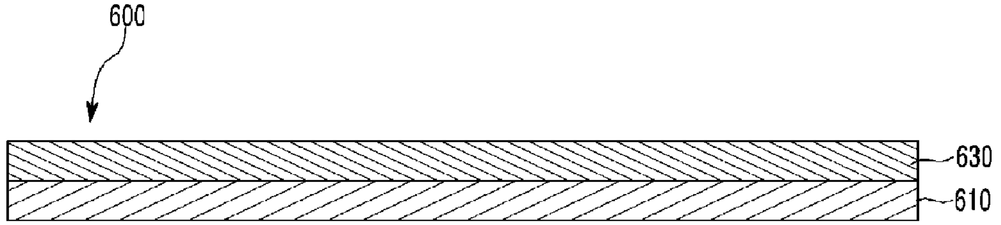
FIG. 7 is a cross sectional view of the lighting module shown in FIG. 4 taken along line A-A'.

FIG. 7 is a cross sectional view of the clad metal substrate 600 shown in FIG. 4 taken along line A-A'.

Referring to FIG. 7, the clad metal substrate 600 may include a first metal layer 610 and a second metal layer 630. The first metal layer 610 is different from the second metal layer 630. Accordingly, the clad metal substrate 600 is able to express the unique advantages of the first and the second metal layers at the same time.

FIG. 7 shows that two metal layers of the clad metal substrate 600 are combined together. However, there is no limit to this. Three or more metal layers of the clad metal substrate 600 may be combined together. The clad metal substrate 600 may be formed by applying heat and pressure to the first and the second metal layers 610 and 630.

Here, a thermal conductivity of the second metal layer 630 may be greater than that of the first metal layer 610. For example, the first metal layer 610 may be made of Aluminum and the second metal layer 630 may be made of copper. In general, while the thermal conductivity of the copper is greater than that of the aluminum, a heat radiation rate of the copper is smaller than that of the aluminum. Therefore, heat radiated from the light emitter 400 should be rapidly far away from the light emitter 400. In only this case, a longer life span of the light emitter 400 can be obtained.

For example, when the first metal layer 610 is made of aluminum and the second metal layer 630 is made of copper, the second metal layer 630 is directly connected to the case 100 and the light emitter 400. In this case, the lighting module according to the embodiment works, heat is generated by the light emitter 400. Then, the initial heat generated from the light emitter 400 increases the temperatures of the first and the second metal layers 610 and 630, and most of the initial heat is radiated outwardly through the first metal layer 610. However, when the light emitter 400 radiates more heat with the lapse of a certain time, a temperature difference between the first metal layer 610 and the case 100 becomes larger, so that most of the heat which is continuously radiated may be transferred to the case 100.

As a result, the lighting module according to the embodiment is able to quickly radiate the heat emitted from the light emitter 400 to the outside and moreover, to make the life span of the light emitter 400 longer.

The lighting module according to the embodiment uses the clad metal substrate 600, thereby reducing the thickness and weight of the lighting module according to the embodiment.

Figure 8:
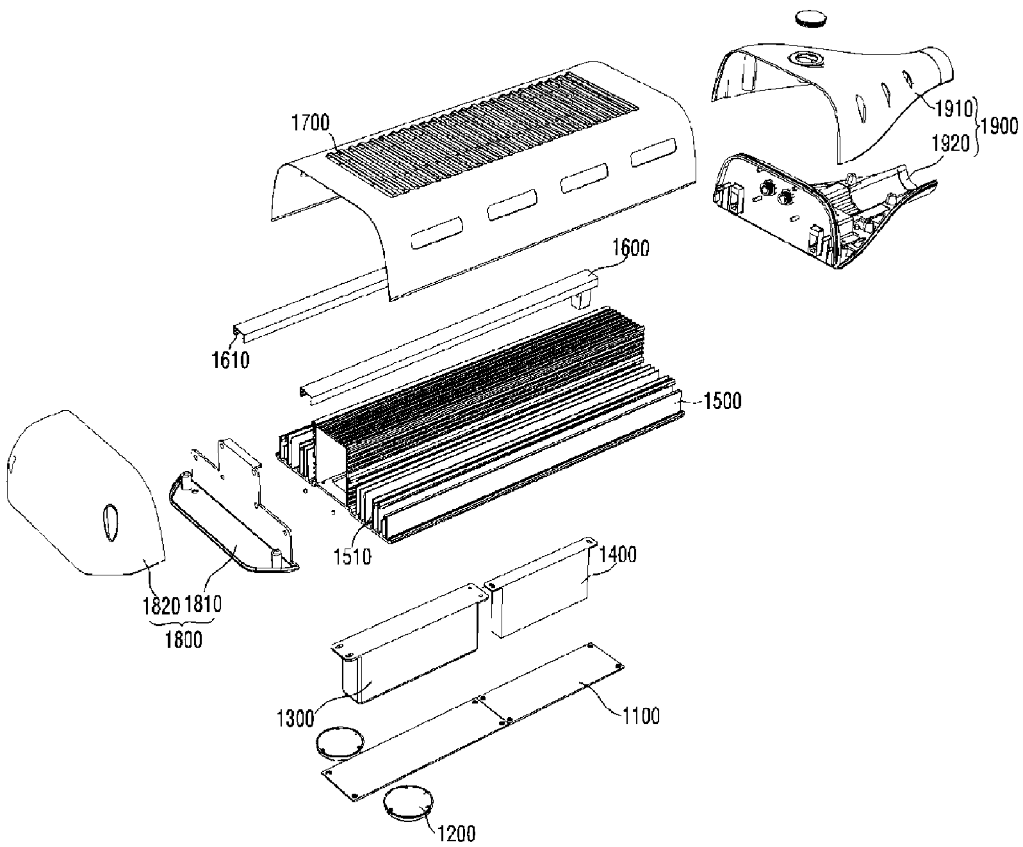
FIG. 8 is an exploded perspective view of a lighting device including the lighting module shown in FIG. 1.

FIG. 8 is an exploded perspective view of a lighting device including the lighting module shown in FIG. 1.

Referring to FIG. 8, the lighting device according to the embodiment may include a lower frame 1100, a lighting module 1200, a power supplier 1300, a programmable logic controller (PLC) module 1400, a heat sink 1500, a waterproof cap 1600, a main cover 1700, a fastener 1800 and a connector 1900.

The lighting module 1200 is disposed in the lower frame 1100. The lower frame 1100 functions to support the bottom surface of the lighting device according to the embodiment. The lower frame 1100 may have, for example, a flat-rectangular shape.

The lighting module 1200 is disposed in the vicinity of the lower frame 1100.

The lighting module 1200 includes a light emitting device or a light emitting device package and emits light. Since the lighting module 1200 corresponds to the lighting module shown in FIGS. 1 to 7, a detailed description of the lighting module 1200 is replaced by the foregoing description.

One lighting module 1200 or two or more lighting modules 1200 may be provided. A plurality of the lighting modules 1200 may be disposed in the form of an array. The lighting module 1200 emits light downward in the drawing.

The power supplier 1300 supplies electric power to the lighting module 1200 and is disposed at about the lighting module 1200. As to be described below, the heat sink 1500 includes a plurality of bent portions, and then may come to include a receiving recess in a lower portion thereof. The power supplier 1300 may be disposed at about the lighting module 1200 and may be disposed in the receiving recess. Also, the lighting module 1200 may be disposed on the top surface of the lower frame 1100 and may be disposed in the receiving recess.

The PLC module 1400 is disposed at about the lighting module 1200 and controls the operation of the lighting module 1200. The PLC module 1400 controls the operation of the lighting module 1200 in accordance with input programs or algorithms. For example, the PLC module 1400 controls the on/off timing, cycle, illuminance or the like of the lighting module 1200.

Partitions may be arranged in substantial parallel with each other on at least a portion of the top surface of the heat sink 1500. The partition may be formed so as to increase the surface area of the heat sink 1500 and improves a heat radiating characteristic. While it is shown in the drawings that the partition is formed in the longitudinal direction of the heat sink 1500, the partition may be also formed in a direction different from the longitudinal direction (for example, either a direction perpendicular to the longitudinal direction or a direction different from the perpendicular direction)

The receiving recess for receiving the power supplier 1300 and the PLC module 1400 may be formed in the lower portion of the heat sink 1500.

The waterproof cap 1600 is coupled to at least a portion of the top surface of the heat sink 1500. The waterproof cap 1600 prevents water from being introduced into the power supplier 1300, the PLC module 1400 and the like which are received in the receiving recess formed in the lower portion of the heat sink 1500. For this purpose, the waterproof cap 1600 may be formed along the edge of the receiving recess formed in the bottom surface of the heat sink 1500. As described above, the partition may be foamed in the top surface of the heat sink 1500. The waterproof cap 1600 may be, for example, coupled between the partitions.

Figure 9:
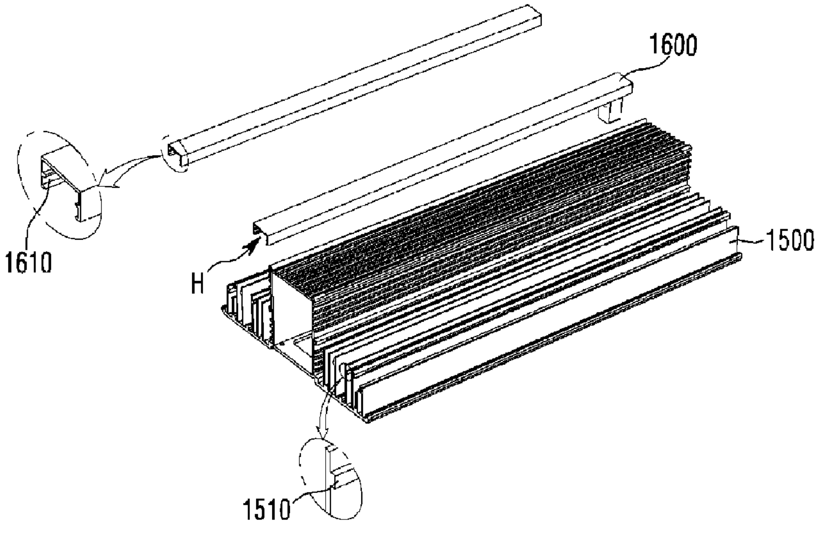
FIG. 9 is a view for describing coupling relation between a waterproof cap and a heat sink, all of which are shown in FIG. 8.

FIG. 9 is a view for describing coupling relation between the waterproof cap 1600 and the partition of the heat sink 1500.

Referring to FIG. 9, the waterproof cap 1600 may have a recess "H" in which at least one partition is received at the time of being coupled to the partition of the heat sink 1500. Further, a coupling recess 1610 which is coupled to the partition may be formed in the inner wall of the recess "H" in the longitudinal direction of the recess "H". A coupling projection 1510 may be formed on at least one partition in such a manner as to be coupled correspondingly to the coupling recess 1610. When the coupling recess 1610 of the waterproof cap 1600 is coupled correspondingly to the coupling projection 1510 formed on the partition of the heat sink 1500, the water can be prevented from being introduced from the edge to the inner area of the heat sink 1500. Two waterproof caps 1600 may be formed as shown in the drawings. Then, the receiving recess may be formed in the lower portion of the area between the points of the heat sink 1500 to which the two waterproof caps 1600 are coupled. As a result, it is possible to prevent the water from being introduced into the power supplier 1300 and the PLC module 1400 which are received in the receiving recess.

The main cover 1700 is formed to cover the top surface of the heat sink 1500. A plurality of openings for heat radiation may be formed in the main cover 1700. In the drawing, the main cover 1700 may be formed to have a shape covering the heat sink 1500 except the both sides and lower portion of the heat sink 1500. The both sides of the heat sink 1500 may be covered by the fastener 1800 and the connector 1900.

The fastener 1800 covers a portion of sides of the heat sink 1500 which cannot be covered by the main cover 1700. The fastener 1800 helps the components to be coupled to each other (for example, coupling of the heat sink 1500 and the main cover 1700, coupling of the heat sink 1500 and the lower frame 1100, or the like). The fastener 1800 may include an inner fastener 1810 and an outer fastener 1820. The inner fastener 1810 comes in direct contact with and is coupled to the heat sink 1500. The inner fastener 1810 may have a shape corresponding to the side cross section of the heat sink 1500. The outer fastener 1820 covers the entire inner fastener 1810. The edge of the outer fastener 1820 comes in contact with the main cover 1700. That is, the main cover 1700 and the outer fastener 1820 function together as an outer cover of the lighting device according to the embodiment.

The connector 1900 is coupled to one of both sides of the heat sink 1500. The connector 1900 may include an upper cover 1910 and a body support 1920. The upper cover 1910 covers the body support 1920. The edge of the upper cover 1910 comes in contact with the edges of the both open sides of the main cover 1700. The body support 1920 functions to support a component (not shown) supporting the lighting device according to the embodiment, for example, a part which is extended and bent from a telegraph pole, a post or the like. To this end, with regard to a coupled body of the body support 1920 and the upper cover 1910, an opening may be formed in a portion of the coupled body, which is opposite to the heat sink 1500. A supporting means of the lighting module can be inserted and fixed to the opening.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting module comprising:

a light emitter comprising a substrate and a light emitting device disposed on the substrate;

a clad metal substrate disposed under the substrate of the light emitter, the clad metal substrate being planar;

an insulating structure disposed on the clad metal substrate;

an optical structure disposed on the light emitter, the optical structure comprising an outer frame surrounding the substrate and a plurality of lenses corresponding to the plurality of the light emitting devices;

a case disposed on the optical structure and coupled to the clad metal substrate; and a packing structure disposed between the optical structure and the case, wherein the insulating structure surrounds the outer frame of the optical structure and insulates the light emitter from the case, wherein the clad metal substrate comprises:

a first metal layer; and a second metal layer disposed on the first metal layer, wherein a thermal conductivity of the second metal layer is greater than a thermal conductivity of the first metal layer, and wherein a diameter of the case is greater than a diameter of the insulating structure.

2. The lighting module of claim 1, wherein the insulating structure surrounds an outer circumferential surface of the substrate and insulates the outer circumferential surface of the substrate from the clad metal substrate.

3. The lighting module of claim 1, wherein the plurality of lenses correspond to the plurality of the light emitting devices one-to-one, and wherein the packing structure is disposed on the outer frame, and wherein the outer frame is disposed on the substrate and causes the lens and the light emitting device to be spaced from each other.

4. The lighting module of claim 1, further comprising a heat radiating plate disposed between the light emitter and the clad metal substrate.

5. A lighting device comprising:

a heat sink which includes a receiving recess and a plurality of partitions disposed on a portion thereof;

one or more lighting modules which are disposed under the heat sink and emit light downward;

a power supplier which is disposed in the receiving recess and supplies electric power to the lighting module; and a waterproof cap which is coupled to at least a portion of the top surface of the heat sink and prevents water from being introduced into the receiving recess of the heat sink, wherein the lighting module includes:

a light emitter including a substrate and a plurality of light emitting diodes disposed on the substrate;

a clad metal substrate disposed under the substrate of the light emitter;

an insulating structure disposed on the clad metal substrate;

an optical structure disposed on the light emitter, the optical structure comprising an outer frame surrounding the substrate and a plurality of lenses corresponding to the plurality of the light emitting devices;

a case disposed on the light emitter and coupled to the clad metal substrate; and a packing structure disposed between the optical structure and the case, wherein the insulating structure surrounds the outer frame of the optical structure and insulates the light emitter from the case by contacting the case, wherein the clad metal substrate comprises a first metal layer and a second metal layer disposed on the first metal layer, wherein a thermal conductivity of the second metal layer of the clad metal substrate is greater than a thermal conductivity of the first metal layer, and wherein a diameter of the case is greater than a diameter of the insulating structure.

6. The lighting device of claim 5, further comprising a programmable logic controller (PLC) module which is disposed in the receiving recess of the heat sink and controls the operation of the lighting module.

7. The lighting device of claim 5, further comprising a main cover which is disposed on the top surface of the heat sink.

8. The lighting device of claim 5, further comprising:

a fastener which is coupled to one of both sides of the heat sink; and a connector which is coupled to the other of both sides of the heat sink.

9. The lighting device of claim 8, wherein the connector comprises:

a body support which receives a component supporting the lighting module; and an upper cover which is disposed on the body support.

10. The lighting device of claim 5, wherein the waterproof cap is coupled near both edges of a position corresponding to the receiving recess.

11. The lighting device of claim 10, wherein a lower portion of the waterproof cap comprises a recess which is coupled to the partition, wherein an inner wall of the recess comprises a coupling recess, and wherein the partition comprises a coupling projection which is coupled correspondingly to the coupling recess.

12. The lighting device of claim 5, wherein the clad metal substrate is planar.

13. A lighting module comprising:

a support layer;

a light emitter which includes a substrate disposed on the support layer and a plurality of light emitting devices disposed on the substrate;

an optical structure covering the light emitter;

a packing structure disposed on the optical structure;

an insulating structure disposed on the support layer and surrounding the optical structure; and a case receiving the light emitter, the optical structure, the packing structure and the insulating structure, and coupled to the support layer, wherein the insulating structure seals a space between the optical structure and the case, wherein the light emitting devices include a light emitting diode (LED), wherein the case comprises a side wall and an edge part, wherein the side wall surrounds the optical structure, the packing structure and the insulating structure, wherein the edge part extends from the side wall, is disposed on the packing structure and defines an opening, wherein the packing structure comprises a top surface contacting the edge part of the case and a bottom surface contacting the optical structure, wherein each of the top surface of the packing structure and the bottom surface of the packing structure has a recess, and wherein a projection from the case engages the recess on the top surface of the packing structure and a projection from the optical structure engages the recess on the bottom surface of the packing structure.

14. The lighting module of claim 13, wherein the support layer has electrically insulation characteristics and thermally a heat radiating characteristic.

15. The lighting module of claim 14, wherein the support layer comprises a polymeric material or a non-metallic material.

16. The lighting device module of claim 13, wherein the edge part comprises a projection part inserted into the receiving recess.

17. The lighting device module of claim 13, wherein the optical structure comprises a projection part inserted into the receiving recess.

18. The lighting module of claim 13, wherein the side wall of the case comprises a projection part extending from a bottom surface of the side wall, and wherein the projection part surrounds a side surface of the support layer.

19. The lighting module of claim 13, wherein the insulating structure comprises a stepped surface, and wherein the side wall of the case comprises a stepped surface contacted with the stepped surface of the insulating structure.

20. The lighting module of claim 13, wherein the side wall of the case comprises a plurality of heat radiating fins.

21. The lighting module of claim 13, wherein the support layer is planar.

22. The lighting module of claim 13, wherein the insulating structure contacts an outer peripheral surface of the support layer.

23. The lighting module of claim 13, wherein the optical structure comprises an outer frame surrounding the substrate and a plurality of lenses corresponding one-to-one to the plurality of the light emitting devices.

24. The lighting module of claim 13, wherein the insulating structure comprises a bottom surface contacting the support layer, and wherein the bottom surface of the insulating structure has a recess.

* * * * *